United States Patent [19]

Forrest

[11] 4,281,413
[45] Jul. 28, 1981

[54] MULTICHANNEL RADIO TELEPHONE SYSTEM

[75] Inventor: Robert T. Forrest, Lynchburg, Va.

[73] Assignee: General Electric Company, Lynchburg, Va.

[21] Appl. No.: 99,551

[22] Filed: Dec. 3, 1979

[51] Int. Cl.³ .............................................. H04B 3/60
[52] U.S. Cl. ................................. 455/34; 179/2 EB; 455/50; 455/54; 455/62
[58] Field of Search ....................... 455/31-34, 455/50, 53, 54, 63, 62; 179/2 EB

[56] References Cited
U.S. PATENT DOCUMENTS

| 2,694,140 | 11/1954 | Gilman et al. | 455/34 |
| 3,571,519 | 3/1971 | Tsimbidis | 455/34 |
| 3,581,013 | 5/1971 | Muller | 179/2 EB |
| 3,634,627 | 1/1972 | Valentini | 455/34 |
| 4,166,927 | 9/1979 | Hamaoki | 179/2 EB |

Primary Examiner—Marc E. Bookbinder

[57] ABSTRACT

Phantom signals resulting from intermodulation between a busy channel and an idle channel with idle tone cause scanning radio stations to lock on a phantom idle channel and miss communications. Locking on a phantom idle channel is prevented by transmitting a busy tone on each channel having communication so that any phantom signals resulting from intermodulation will include busy tone. A scanning station is arranged to lock on a channel with only idle tone, and not lock on any channel (real or phantom) with busy tone.

8 Claims, 5 Drawing Figures

FIXED STATION TRANSMITTER

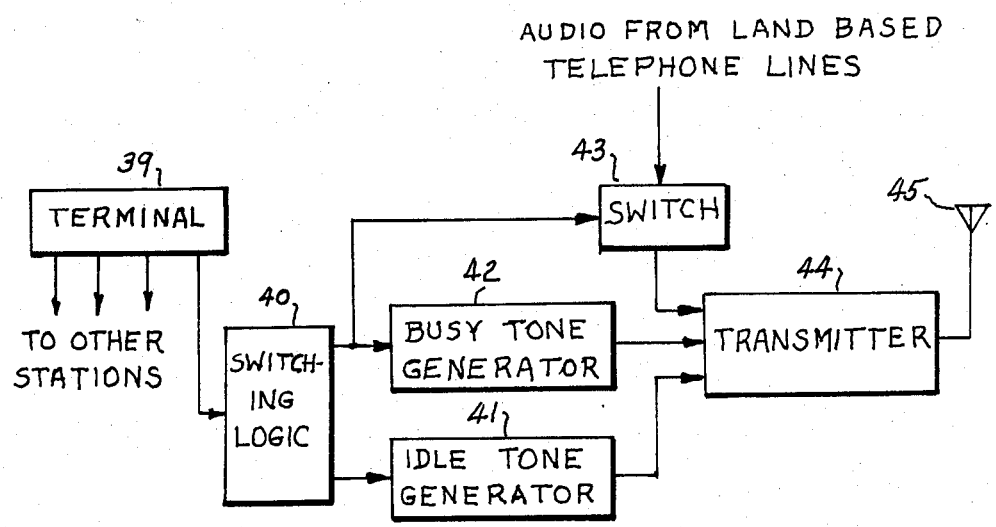
FIG. 4  FIXED STATION TRANSMITTER
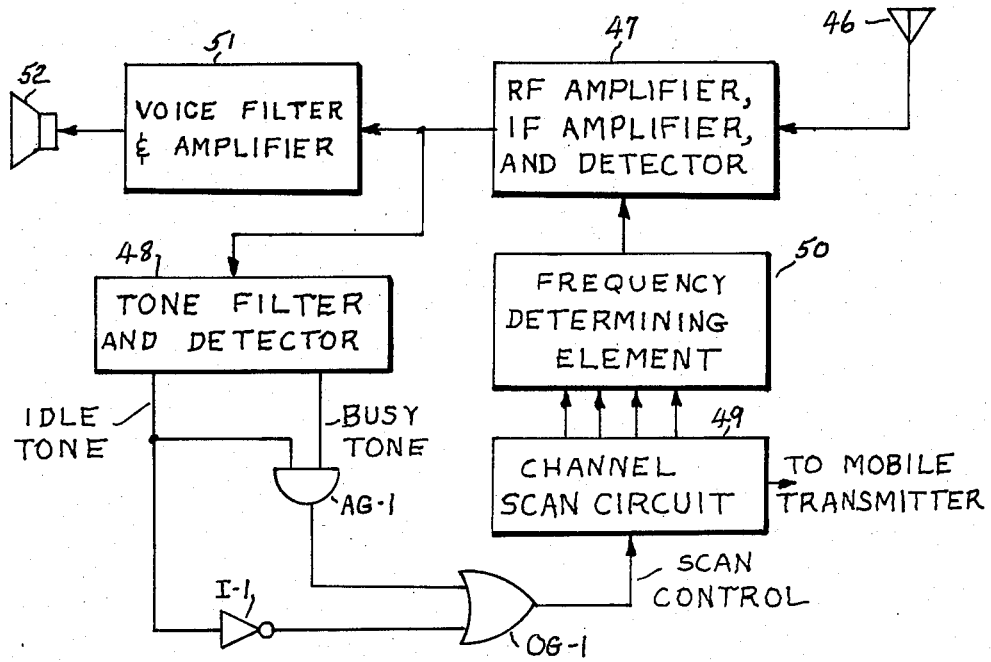
FIG. 5  MOBILE STATION RECEIVER

MULTICHANNEL RADIO TELEPHONE SYSTEM

BACKGROUND OF THE INVENTION

My invention relates to an improved multichannel radio telephone system, and particularly to an arrangement or method for causing a station in such a system to lock on a true idle channel and not lock on a phantom idle channel resulting from intermodulation.

In multichannel radio telephone systems having equally spaced radio frequency channels (that may or may not be contiguous), intermodulation is a frequent problem. To a lesser extent, intermodulation is also a problem in systems having unequally spaced channels. Intermodulation is the production of undesired frequencies representing the sums and differences of the respective desired frequencies being produced by two transmitters. For example, if two radio frequency transmitters are respectively transmitting on frequencies F1 and F2, the general expression for intermodulation products would be $NF1 \pm MF2$, where N and M are integers, and the order of a product is $N+M$. The intermodulation products of greatest concern are generated by $NF1-MF2$, where $N=M+1$. The strongest intermodulation product would be the third order products of $2F1-F2$ and $2F2-F1$. If F1 is less than F2, this may also be mathematically described by making use of the difference frequency $\Delta$ between F1 and F2. In this case, the third order intermodulation products would be $F2+\Delta$ and $F1-\Delta$, and the fifth order products would be $F2+2\Delta$ and $F1-2\Delta$. Pth order products are thus determined by $F2+Q\Delta$, and $F1-Q\Delta$, where $P=2Q+1$. When radiated, the strongest intermodulation signals are usually the third order products $F2+\Delta$ and $F1-\Delta$. These intermodulation signals can and frequently do cause improper or false operation of the system.

Accordingly, a general object of my invention is to provide a new and improved multichannel radio telephone system in which false operation resulting from intermodulation is substantially reduced.

Another object of my invention is to provide a new and improved arrangement for use in a multichannel radio telephone system that eliminates false operation resulting from intermodulation in such a system.

One multichannel radio telephone system that is extensively used comprises a terminal controlling fixed stations and semi-intelligent mobile stations. The fixed radio stations and terminal and the satellite or mobile radio stations must all be aware at all times which channel is next in line to be used. This is accomplished by the terminal and fixed stations sending a continuous idle tone on the channel that is to be used next. Each of the satellite or mobile stations scans the locally available channels, and locks on the channel with idle tone to await or to initiate a call or message. Such calls or messages may be either land originated or mobile originated. The nature of this sequence of operation, and the fact that the closely spaced (sometimes contiguous) and evenly spaced channels are particularly prone to intermodulation interference create a well known problem: a working channel and an idle channel are mixed to produce a phantom channel on another frequency. This channel has superimposed on it the audio information carried on both channels. Frequently, this other frequency is the same as that of another channel in the radio telephone system. Hence, a mobile station which is searching for an available channel with idle tone may lock on the phantom channel with idle tone. This mobile station will therefore be blocked from access to the communication system until the phantom idle signal disappears, releasing the mobile station to search again for a true idle channel.

Accordingly, another object of my invention is to provide a new and improved arrangement that prevents a mobile unit from locking on a phantom idle channel in a multichannel mobile radio telephone system.

One way that prior art multichannel radio telephone systems have attempted to eliminate the intermodulation problem has been to energize all of the system transmitters with low power at all times, and to switch to high power either when idle tone is transmitted, or when the station is actively engaged in communications, i.e. busy. This arrangement masks or hides the intermodulation-produced phantom channel signals, so that a mobile station scanning for the true idle channel does not receive the phantom idle channel signals. This has worked fairly well in the traditional single cell radio telephone system having a relatively small number of stations and channels. However, several problems present themselves when this arrangement is applied to the larger multicell type radio telephone systems with more than one channel. Some of these problems are:

A. Emergency backup power capacity is wasted when non-communicating transmitters are activated continuously.

B. Intermodulation phantom channels may appear on a channel that is not locally available in a given cell, but that must still be scanned by a mobile station since the channel is available in the system.

C. Depreciation and increased failures of the radio equipment result, since all of the stations in a system must be on at all times.

Accordingly, a general object of my invention is to provide a new and improved arrangement for multichannel radio telephone systems that eliminates many or all of the problems resulting from the prior art solutions mentioned above.

SUMMARY OF THE INVENTION

Briefly, these and other objects are achieved in accordance with my invention by an arrangement that provides a sub-audible busy tone on each channel being used in a radio telephone system, but not on the idle channel. Any intermodulation signals, produced by mixing the idle channel and the idle tone with a busy channel and the busy tone, will include both tones. When the busy tone is present on a channel, that channel may be rejected by a receiver scanning for the true idle channel with only the idle tone on it.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawings, in which:

FIG. 4 shows a block diagram of one embodiment of a fixed station radio telephone transmitter for use in a system utilizing my invention; and FIG. 5 shows a block diagram of one embodiment of a mobile station radio telephone receiver for use in a system utilizing my invention.

DESCRIPTION OF THE PREFERRED EMBODIMENT-BACKGROUND

Figure 1:
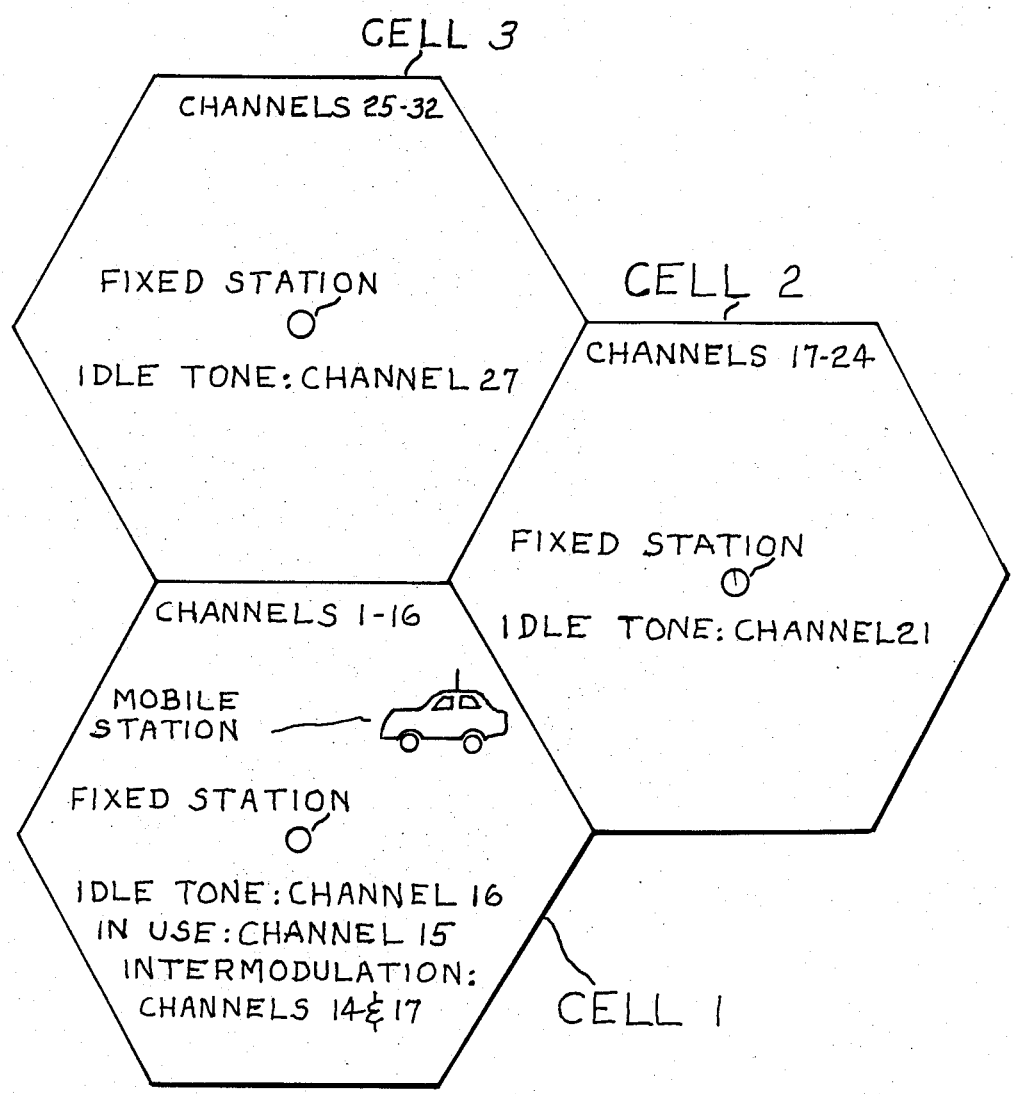
FIG. 1 shows an example of a multichannel radio telephone system for which my invention is intended.

FIG. 1 shows an example of a multichannel radio telephone system for which my invention is intended. As known in the art, some geographical locations requiring radio telephone systems for satellite or mobile stations are divided into a plurality of areas or cells. FIG. 1 includes three cells, each of which is allocated a desired or needed number of a total of 32 equally spaced available radio frequency channels. In such systems, a channel usually includes two radio frequencies so that simultaneous transmission and reception can take place. In the example of FIG. 1, cell 1 is allocated 16 channels designated 1 through 16; cell 2 is allocated 8 channels designated channels 17 through 24; and cell 3 is allocated 8 channels designated channels 25 through 32. Typically, each cell includes one fixed station for each channel represented in that cell. All of the stations throughout the system would normally be controlled by a central processing unit or terminal. A number of mobile stations in the system would be able to maintain simultaneous communication with the system. In certain circumstances, one station may be capable of transmitting on one of several channels as controlled by the terminal. However, that is not the case in this example. A mobile station such as shown in cell 1 should be able to operate on each of the channels allocated to the cells in which the mobile station can travel. Thus, the mobile station of cell 1 should be able to transmit and receive on all channels 1 through 32. In such systems, one fixed station transmitter in each cell transmits an idle tone on a selected one of the channels. The particular channel which is provided with the idle tone may be determined at the fixed station or more usually by the terminal. When this designated idle channel becomes busy, another channel will be selected and provided with the idle tone. All mobile stations in the cell have a scanning receiver which scans all channels until the idle tone is found. When the idle tone is found, the scanning stops, and the mobile receiver and transmitter remain on the idle channel for operation. This operation includes initiating or receiving a call. Thus, in cell 1, if the idle tone is on channel 16, the mobile stations which are not engaged in conversation will lock on channel 16 so that they can receive or transmit a call. Similarly, mobile units in cell 2 will lock on idle channel 21, and mobile units in cell 3 will lock on idle channel 27. As indicated in FIG. 1, channel 15 is in use in cell 1. If the channel spacings are equal, this can cause intermodulation on adjacent channels 14 and 17.

Figure 2:
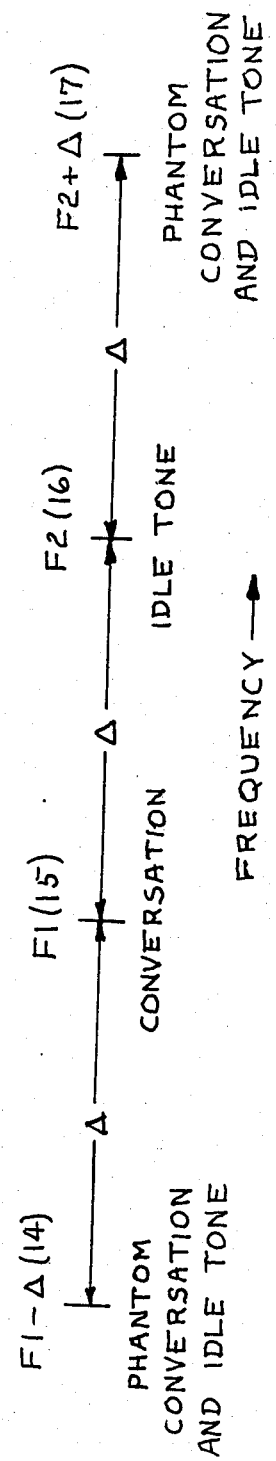
FIG. 2 illustrates how intermodulation problems are produced with prior art systems.

This intermodulation is illustrated in FIG. 2. In FIG. 2, a conversation or busy condition exists on the channel frequency F1. The channel frequency F2 is transmitting an idle tone. As shown in FIG. 2, these frequencies are separated by a frequency $\Delta$. Intermodulation signals may and usually will occur on the channel frequencies $F2+\Delta$, $F2+2\Delta$, etc., and on the channel frequencies $F1-\Delta$, $F1-2\Delta$, etc. These intermodulation frequencies will contain the audio information transmitted on both the channel frequencies F1 and F2. With respect to FIG. 1, the frequency F1 might be channel 15, the frequency F2 might be channel 16, and the intermodulation frequencies might be channels 14 and 17. As shown in FIG. 2, the intermodulation or phantom frequencies include the conversation and the idle tone. Hence, a mobile station which is not transmitting might scan and lock on a phantom channel 14 or 17 rather than the true idle channel 16. This would cause the mobile and fixed equipment to be out of synchronization, which would deny the mobile unit access to the system. In the system illustrated in FIG. 1, mobile stations in cells 2 and 3 might also lock on the phantom idle channels 14 and 17 rather than their respective true idle channels 21 and 27. Thus, the intermodulation problem may be compounded in cellular systems.

DESCRIPTION OF THE PREFERRED EMBODIMENT—THE INVENTION

Figure 3:
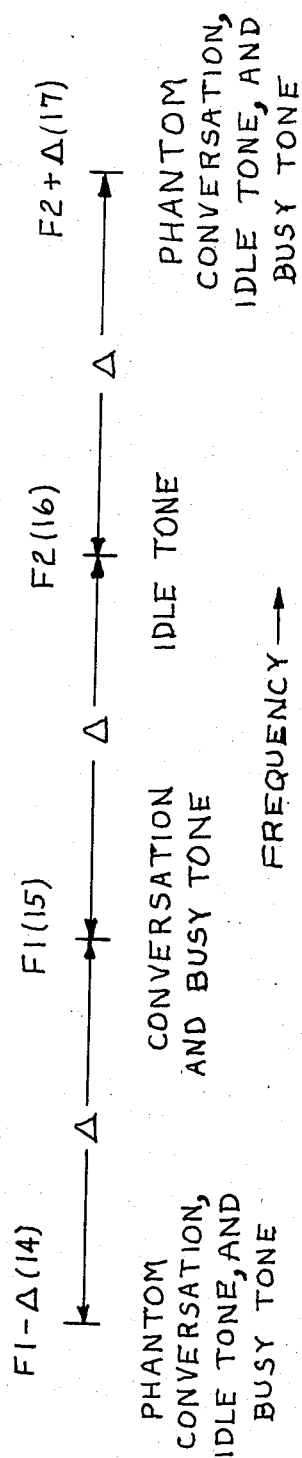
FIG. 3 illustrates how intermodulation problems are eliminated in accordance with my invention.

In order to eliminate the problems outlined above, I have provided a system or method wherein the channel in use transmits a busy tone as well as the information or conversation that would normally be transmitted. This busy tone might be any suitable audio frequency. I prefer a subaudible frequency below the audio frequencies used for voice transmission and different from the idle tone frequency. (Tone squelch is ideal, and is currently available.) FIG. 3 illustrates the result of using the busy tone along with the conversation or voice. In FIG. 3, I have assumed the same conditions as those shown in FIG. 2, namely a conversation on the channel frequency F1 (along with my added busy tone), an idle tone on the channel frequency F2, and the phantom signals on the channel frequencies $F1-\Delta$, and $F2+\Delta$. These phantom signals include the conversation, the idle tone, and the busy tone. Thus, in accordance with my invention, a scanning receiver can be made that will reject any channel containing a busy tone (which would be either busy or phantom), and will lock only on a transmission containing exclusively an idle tone. Thus, in accordance with my invention, scanning will continue until only a true idle tone is found on a channel.

FIG. 4 illustrates one embodiment of a fixed station transmitter which can be provided to utilize my invention. The fixed station transmitter communicates with mobile stations, and is usually connected to and controlled by a central terminal 39. Upon being selected as an idle channel transmitter, switching logic 40 activates an idle tone generator 41. The generated idle tone is applied to the station radio transmitter 44 and antenna 45. When the station becomes an in-service or busy station, the switching logic 40 deactivates the idle tone generator 41, and activates a busy tone generator 42 and closes a switch 43 so that busy tone and conversational audio are applied to the transmitter 44. When the station is neither busy nor idle, no circuit is activated, and the transmitter 44 is silent.

The mobile station receiver is shown in FIG. 5. A radio signal from a fixed station is intercepted by an antenna 46, and amplified and detected by a circuit 47. The resultant audio is applied to a tone filter and detector 48 to detect the presence or absence of idle or busy tones. Logic elements including an AND gate AG-1, an OR gate OG-1, and an inverter I-1 provide a scan control output to control a channel scan circuit 49. This circuit 49 causes a frequency determining element 50 to step through the channels, pausing long enough at each one for the logic circuit to indicate the presence or absence of busy and idle tones. In the embodiment shown, I have assumed that the presence of a tone at the output of the detector 48 is indicated by a logic 1, and the absence of a tone is indicated by a logic 0. If an idle tone without a busy tone is indicated, the scanning circuit 49 stops, and communication is enabled. In the receiver, the radio frequency amplifier may be broad band, or may include tuning elements which are changed or switched along with the frequency determining elements 50. The detected signals from the circuit 47 are also applied to a voice filter and amplifier 51 which rejects any tone frequencies present and supplies only intelligence or voice information to a loudspeaker 52.

The idle tone and busy tone outputs from the detector 48 are applied to the inputs of a two input AND gate AG-1. The output of the AND gate AG-1 is applied to one input of an OR gate OG-1. The idle tone output is also applied to a logic inverter I-1 whose output is applied to the other input of the OR gate OG-1. The output of the OR gate OG-1 is applied to the channel scan circuit 49. I have assumed that when the OR gate OG-1 produces a logic 1, the circuit 49 causes the frequency determining elements 50 and associated circuits to scan; and that when the OR gate OG-1 produces a logic 0, the circuit 49 causes the frequency determining elements 50 and associated circuits to stop scanning. If the tone filters and detectors 48 detect both idle tone and busy tone, scanning is caused to continue. If no tone is detected on a channel, scanning continues. If busy tone only is detected on a channel, scanning continues. However, if only idle tone is detected on a channel, scanning is stopped, the receiver becomes activated or operable on that channel, and the associated transmitter may also and preferably does become operable on that channel. Thus with respect to FIG. 3, detection of the idle tone only on the frequency F2 is the only condition in which scanning will stop. The presence of busy tone on the frequency F1 or the presence of both idle and busy tones on the frequencies F1−Δ or F2+Δ should and does cause scanning to continue. This logic operation is illustrated in the following truth table:

| Idle Tone | Busy Tone | Result |
| --- | --- | --- |
| 0 (Absent) | 0 (Absent) | 1 (SCAN) |
| 0 (Absent) | 1 (Present) | 1 (SCAN) |
| 1 (Present) | 0 (Absent) | 0 (STOP SCAN) |
| 1 (Present) | 1 (Present) | 1 (SCAN) |

From the above truth table, it will be seen that if idle tone and busy tone are both absent, scanning continues. If idle tone is absent but busy tone is present, scanning continues. But if idle tone is present and busy tone is absent, scanning will be stopped, and the receiver and transmitter rendered operable. And finally, if both idle tone and busy tone are present, scanning will continue. Thus, by causing a transmitter to transmit a busy tone whenever it is in use, my invention prevents a radio system from scanning and locking on phantom or false radio frequency signals containing an idle tone.

CONCLUSION

It will thus be seen that I have provided a new and improved method or arrangement for use with multichannel radio telephone systems. While I have shown only one application of my invention, and only one example of a radio transmitter and receiver for utilizing my invention, persons skilled in the art will appreciate that my invention can be used in other applications, in other types of radio transmitters and receivers, with various tone frequencies, and with other logic arrangements for achieving the results provided by my invention. Therefore, while my invention has been described with reference to a particular embodiment, it is to be understood that modifications may be made without departing from the spirit of the invention or from the scope of the claims.

What I claim as new and desire to secure by Letters Patent of the United States is:

1. In a communication system having a plurality of spaced radio channels on which intermodulation signals may be present, and having means for transmitting an idle tone on a selected one of said channels to indicate that said one channel is idle and available for communication, the improvement comprising means for transmitting a busy tone on each channel that is being used for communication, whereby intermodulation signals which are present include both said idle channel tone and said busy tone, and said idle channel includes said idle tone without said busy tone.

2. The communication system of claim 1, and further comprising a receiver that is rendered operable on said idle channel by said idle tone only but that is not rendered operable by both said idle tone and said busy tone.

3. The communication system of claim 2 wherein said receiver is a scanning receiver which, when rendered operable by said idle tone, renders an associated transmitter operable on said idle channel.

4. An improved multichannel radio telephone system comprising:
    (a) a plurality of stations each having a transmitter and receiver;
    (b) a central terminal connected to each of said stations for selectively activating a station to transmit an idle tone when said selected station is available for use, and to transmit a busy tone when said selected station is being used for communicating;
    (c) and a plurality of satellite stations each having a transmitter and receiver, said satellite stations each further having scanning means for selecting a radio channel having only an idle tone, and for rejecting any radio channel having both an idle tone and a busy tone, or only a busy tone.

5. In a multichannel radio telephone system comprising:
    (a) at least one fixed station having transmitter means capable of transmitting on each of a plurality of radio channels, and further capable of transmitting an idle signal on a channel that is designated for communication;
    (b) a plurality of mobile stations each having a transmitter and receiver capable of being tuned to operate on each of said plurality of radio channels;
the improvement comprising:
    (c) means at said fixed station for transmitting a busy signal along with communication information transmitted on each of said channels;
    (d) and means at each of said mobile stations for tuning said transmitter and receiver to each of said channels, continuing said tuning in response to a busy signal on a channel, and stopping said tuning in response to only an idle signal on a channel.

6. The improvement of claim 5 wherein said idle signal and said busy signal are audio tones.

7. The improvement of claim 5 or claim 6 wherein said means for tuning further continue said tuning in the absence of any signal on a channel.

8. In a multichannel radio telephone system in which a plurality of spaced radio channels are used for providing communication for a plurality of stations, a method for preventing a station from locking on a channel because of intermodulation, comprising the steps of:

(a) at a station, transmitting a busy signal on each channel having communication thereon;

(b) at said station, transmitting an idle signal on a selected channel designated for communication;

(c) at another station, scanning each of said channels;

(d) at said scanning station, continuing said scanning in response to each channel having said busy signal thereon or having said busy signal and said idle signal thereon;

(e) at said scanning station, stopping said scanning on the channel having only said idle signal thereon;

(f) and at said stopped scanning station, rendering said station operable on said channel having only said idle signal thereon.

* * * * *